(12) United States Patent
Xu et al.

(10) Patent No.: US 8,498,517 B2
(45) Date of Patent: Jul. 30, 2013

(54) METHOD AND SYSTEM OF IMPLEMENTING MULTIMEDIA RECORDING AND MEDIA RESOURCE HANDLING DEVICE

(75) Inventors: Zhiyong Xu, Shenzhen (CN); Jun Zhang, Shenzhen (CN); Cheng Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 963 days.

(21) Appl. No.: 12/190,427

(22) Filed: Aug. 12, 2008

(65) Prior Publication Data

US 2008/0298778 A1   Dec. 4, 2008

Related U.S. Application Data

(63) Continuation of application No. PCT/CN2006/003181, filed on Nov. 27, 2006.

(30) Foreign Application Priority Data

Feb. 14, 2006   (CN) .......................... 2006 1 0033656

(51) Int. Cl.
*H04N 9/80* (2006.01)
(52) U.S. Cl.
USPC ........................................................ 386/248
(58) Field of Classification Search
USPC ..... 386/217, 248, 291–295; 709/223; 725/46, 725/58, 114, 134, 142; 707/999.2
See application file for complete search history.

(56) References Cited

U.S. PATENT DOCUMENTS

| 6,418,214 | B1 | 7/2002 | Smythe et al. |
| 6,574,642 | B1 | 6/2003 | James |
| 6,763,377 | B1 * | 7/2004 | Belknap et al. ................ 709/223 |
| 2004/0101271 | A1 * | 5/2004 | Boston et al. ................... 386/46 |

(Continued)

FOREIGN PATENT DOCUMENTS

| CN | 1545281 A | 11/2004 |
| CN | 1613254 A | 5/2005 |

(Continued)

OTHER PUBLICATIONS

Written Opinion of the International Searching Authority in corresponding International Patent Application No. PCT/CN2006/003181 (Feb. 1, 2001).

(Continued)

*Primary Examiner* — Thai Tran
*Assistant Examiner* — Stephen Smith
(74) *Attorney, Agent, or Firm* — Leydig, Voit & Mayer, Ltd.

(57) ABSTRACT

A method of implementing multimedia recording, comprises the following steps of: (1) establishing a multimedia channel between a media resource handling device and a recording data source; (2) a media resource controller including media controlling parameters, and indicating the media resource handling device to start a multimedia recording operation via said multimedia channel; (3) depending on the parameters indicated by the media resource controlling device, the media resource handling device saving the received media data as a multimedia data file according to a format indicated by the parameters. A system of implementing multimedia recording and media resource handling device. Using this method, system and the media resource handling device of present invention can make the media resource controller indicate the media resource handling device to implement the multimedia recording operation.

13 Claims, 4 Drawing Sheets

U.S. PATENT DOCUMENTS

| | | | |
|---|---|---|---|
| 2004/0151474 A1* | 8/2004 | Suh | 386/83 |
| 2005/0193023 A1* | 9/2005 | Ismail | 707/200 |
| 2007/0033617 A1* | 2/2007 | Bloebaum | 725/58 |
| 2007/0186246 A1* | 8/2007 | Goldhor | 725/46 |
| 2007/0189712 A1* | 8/2007 | Hirayama et al. | 386/83 |
| 2008/0013919 A1* | 1/2008 | Boston et al. | 386/83 |

FOREIGN PATENT DOCUMENTS

| | | |
|---|---|---|
| EP | 1111892 A2 | 6/2001 |
| EP | 1 139 212 A2 | 10/2001 |
| WO | WO 98/13995 A1 | 4/1998 |
| WO | WO 2006/006334 A1 | 1/2006 |
| WO | WO 2006/011401 A1 | 2/2006 |

OTHER PUBLICATIONS

1st Office Action in corresponding Chinese Patent Application No. 200610033656.9 (May 9, 2008).

2nd Office Action in corresponding Chinese Patent Application No. 200610033656.9 (Feb. 20, 2009).

1st Office Action in corresponding Chinese Patent Application No. 200680012687.4 (Jun. 19, 2009).

2nd Office Action in corresponding Chinese Patent Application No. 200680012687.4 (Jan. 6, 2010).

"TX 23.228-3rd Generation Partnership Project; Specification Group Services and System Aspects; IP Multimedia Subsystem (IMS); Stage 2 (Release 7)," 3GPP Technical Specification, Dec. 2005, V7.2.0, 3GPP, Valbonne, France.

"H.248.1-Series H: Audiovisual and Multimedia Systems; Infrastructure of Audiovisual Services—Communication Procedures; Gateway Control Protocol: Version 3," ITU-T Recommendation, Sep. 2005, International Telecommunication Union, Geneva, Switzerland.

"H.248.2-Series H: Audiovisual and Multimedia System; Infrastructure of Audiovisual Services —Communication Procedures; Gateway Control Protocol: Facsimile, Text Conversation and Call Discrimination Packages," ITU-T Recommendation, Jan. 2005, International Telecommunication Union, Geneva, Switzerland.

1st Office Action in corresponding European Patent Application No. 06817903.5 (Aug. 31, 2012).

"H.248.1-Series H: Audiovisual and Multimedia Systems: Infrastructure of audiovisual services—Communication procedures; Gateway control protocol: Version 3," Sep. 2005, ITU-T, Geneva, Switzerland.

"H.248.2-Series H: Audiovisual and Multimedia Systems: Infrastructure of audiovisual services—Communication Procedures; Gateway control protocol: Facsimile, text conversation and call discrimination packages," Jan. 2005, ITU-T, Geneva, Switzerland.

"H.248.9-Series H: Audiovisual and Multimedia Systems: Infrastructure of audiovisual services—Communication procedures; Gateway control protocol: Advanced media server packages," Mar. 2002, ITU-T, Geneva, Switzerland.

* cited by examiner

METHOD AND SYSTEM OF IMPLEMENTING MULTIMEDIA RECORDING AND MEDIA RESOURCE HANDLING DEVICE

CROSS-REFERENCE TO RELATED APPLICATION

This application is a continuation of International Patent Application No. PCT/CN2006/003181, filed Nov. 27, 2006, which claims priority to Chinese Patent Application No. 200610033656.9, filed Feb. 14, 2006, both of which are hereby incorporated by reference in their entirety.

FIELD OF THE INVENTION

The present invention relates to the communication field and in particular to a multimedia recording method and system, and a media recourse processor.

BACKGROUND OF THE INVENTION

Multimedia recording refers to a procedure in which the video and audio are recorded by a video camera and stored on a storage medium. Current video cameras, mobile phones provided with a camera, etc. are provided with such a function.

For use on a communication network device, the data obtained by a video camera can be collected via a communication terminal, and content of the data obtained by a video camera can be stored in a storage device of the communication network. In this way, functions of multimedia mailbox messages, multimedia video storage, etc. can be realized.

The above service is also required to be realized in a network device with the architecture in which media resource processing is separated from media controlling, such as WCDMA IMS (IP Multimedia Subsystem). However, when the H.248 protocol is employed as a control interface, the H.248 protocol has to be extended.

The H.248 protocol is a protocol defined by the ITU-T SG16 Standards Organization and dedicated for controlling media resources, which is used to control media resource processor, such as a media gateway, a media server, etc.

An essential principle of the H.248 protocol is that various resources on a media resource processor are abstracted as terminals divided into physical terminals and temporary terminals. The physical terminal represents a physical entity that semi-persistent exists, such as a TDM timeslot. The temporary terminal represents a common resource that would be released after a use as requested temporarily, such as an RTP stream. Combinations of terminals are abstracted as context, and the relationship between terminals is described with a topology. Based on such abstractions, a call connection is actually an operation on the terminals and the context, which is accomplished via command requests and responses between a media recourse controller and a media resource processor. The commands include Addition, Modification, Deletion, Notification, etc. The command parameters, referred to as descriptors, are divided into Property, Signal, Event and Statistic. Service-related parameters are logically aggregated into a package which is an approach provided from the H.248 protocol for extension of protocol functions.

Media controllers obtain sets of codec capabilities of subordinate gateways of each other by exchanging messages, and during setting up a bearer channel, select a codec supported by the gateways on both ends as a codec format for a final bearer channel that has been set up. Such a process is a negotiation process about the bearer capability.

In the WCDMA IMS network, the architecture of a network for processing a media resource service is as shown in FIG. 1, where: an AS (Application Server) functional entity processes a service, and an operator provides a supported service through the AS which also has a new demand for the corresponding service on other network elements an S-CSCF (Serving Call Session Control Function) functional entity processes routing, that is, the S-CSCF functional entity forwards correctly a message sent from the AS to an MRFC (Multimedia Resource Function Controller), or routes correctly a message sent from an MRFC to another MRFC; the MRFC functional entity is responsible for controlling media resources, that is, according to a requirement of the AS, the MRFC functional entity selects an MRFP (Multimedia Resource Function Processor), and controls the processing of media resources; and the MRFP functional entity is responsible for processing the media resources, and accomplishes a media resource operation sent from the AS under the control of MRFC.

The SIP (Session Initial Protocol) protocol and the XML protocol or the SIP protocol and a protocol similar to the XML (VXML is one derived from XML) are used for interfaces between the AS, S-CSCF, and MRFC functional entities. An interface between the MRFC and MRFP functional entities is referred to as an Mp interface using the H.248 protocol, and an outward interface of the MRFP is referred to as an Mb interface. A user media stream is typically borne through the RTP protocol.

Only the functions of voice playing and recoding can be realized between an MRFC and an MRFP in the WCDMA IMS network, and an extension of the protocol needs to be implemented for multimedia recoding function. In the case of a fixed network where the H.248 protocol is used as a control protocol, the multimedia recoding function cannot be supported.

SUMMARY OF THE INVENTION

An object of the present invention is to overcome drawbacks of the prior art described above by providing a multimedia recording method and system so that a media resource controller can instruct a media resource processor to implement a multimedia recording function.

In order to overcome the above technical drawbacks, the invention provides a multimedia recording method including the steps of:

setting up a multimedia channel between a media resource processor and a data source recorded;

carrying, by a media resource controller, a media control parameter to instruct the media resource processor to initiate a multimedia recording operation via the multimedia channel;

according to the parameter carried by the media recourse controller, storing, by the media resource processor, the received media data in a format specified by the parameter that was indicated by the media resource controller.

Further, the media resource controller sends a multimedia recording request to the media resource processor, instructing the media resource processor to initiate the multimedia recording operation, and the multimedia recording request carries recording control parameters including: a record file identifier parameter, a file format parameter, a maximum number of times for rerecording parameter, a maximum length of recording parameter, a rerecording parameter, and a recording cancel parameter; in which:

a maximum number of times allowed for rerecording is controlled according to the maximum number of times for rerecording parameter; and a maximum length allowed for recording is controlled according to the maximum length of recording parameter.

The record file identifier parameter instructs a location to store a multimedia record file and a filename, and the multimedia record file is in a form of a local file, a local file containing a path, and a file on a remote server.

Further, the media resource processor, according to the file format parameter, stores the received multimedia data in a file specified by the record file identifier parameter.

The multimedia recording request specifies two replay parameters of replay volume and replay speed, instructing it to provide a replay of recorded contents for a user during recording.

If the rerecording parameter carried in the multimedia recording request is received during recording, then multimedia rerecording is performed.

If the recording cancel parameter carried in the multimedia recording request is received during recording, then a result for recording is cancelled and a recorded file is deleted.

The method further includes: instructing, by the media resource controller, the media resource processor to create a persistent file after recording ends.

The method further includes: reporting, by the media resource processor, a result for recording to the media resource controller.

The reported result for recording includes a location, a name, and a length of a recorded file.

When the multimedia recording operation performed by the media resource processor fails, the media resource processor reports a failure reason to the media resource controller.

The invention provides a multimedia recording system, including a media resource controller, a media resource processor, and a multimedia channel between the media resource processor and a data source recorded. The media resource controller sends a multimedia recording instruction to the media resource processor, and the media resource processor initiates a multimedia recording operation through the multimedia channel according to the multimedia recording instruction, and stores a file in a format according to a file format parameter.

The media resource processor sends a result for recording to the media resource controller after finishing recording.

The invention provides a media resource processor, including: a recording operation unit adapted to receive an instruction from a media resource controller, and to initiate a multimedia recording operation through a multimedia channel which is set up with a data source recorded; and a storage operation unit adapted to store media data received by the recording operation unit in a file of multimedia data as a specified format.

The invention provides the following advantageous effects: in a scenario where media resource devices are controlled through the H.248 protocol, with the method and system of the invention, the media resource controller sends to the media resource processor a multimedia recording package, instructing to perform multimedia recording in such a way that a capability support can be provided for a service related to multimedia recording, so that a service of such as multimedia message mailbox and the like can be realized, for example on the media resource control and processing devices of the WCDMA IMS.

BRIEF DESCRIPTIONS OF THE DRAWINGS

DETAILED DESCRIPTIONS OF THE EMBODIMENTS

Figure 1:
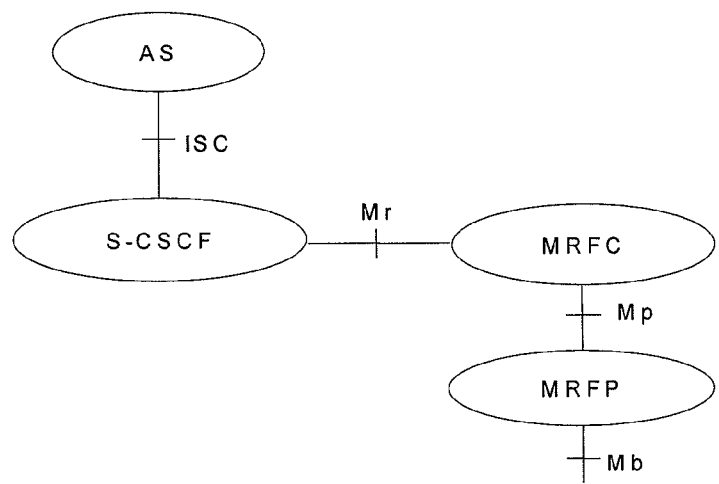
FIG. 1 is a diagram of the architecture of a network for processing a media resource service in a WCDMA IMS network.
Figure 2:
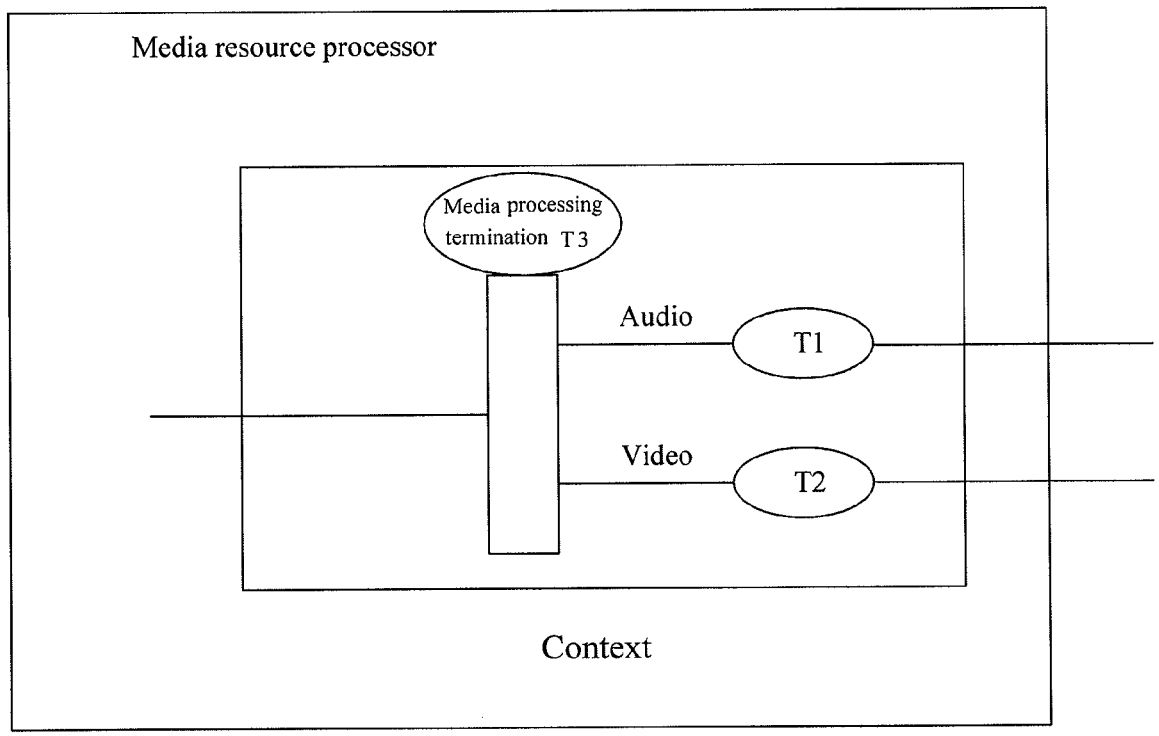
FIG. 2 is a structural diagram of a session model established by a media resource processor according to a first embodiment of the invention.

FIG. 2 is a structural diagram of a session model established by a media resource processor according to a first embodiment of the invention. Two real time streams, a video stream and an audio stream, are set up between a media resource processor and a multimedia source, and the two streams are converged at a media processing termination T3 of a media gateway, where the two streams can be processed and time-associated, and can be processed in a format specified by a media resource controller to generate a desired file.

Figure 3:
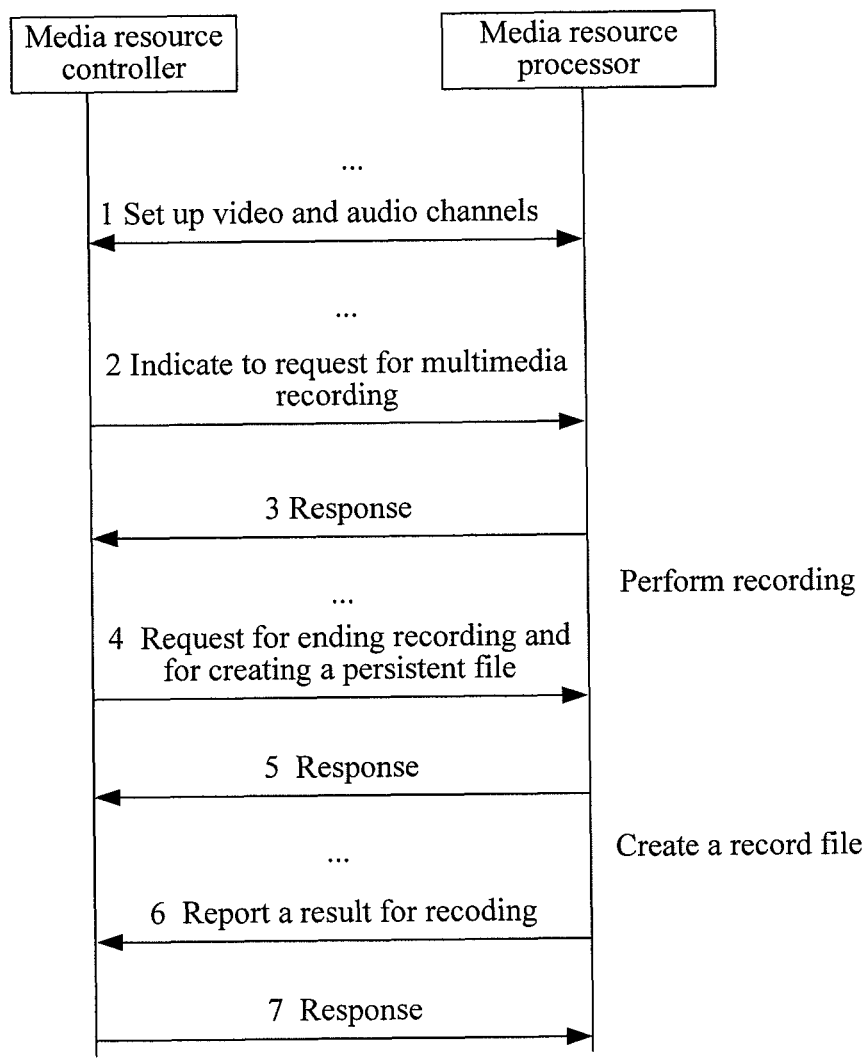
FIG. 3 is a flow chart of an embodiment of implementing a multimedia recoding method through the H.248 protocol according to the invention.

FIG. 3 is a flow chart of an embodiment of implementing a media recoding method through the H.248 protocol according to the invention.

In step 1, between a media resource processor and a data source recorded, video and audio channels are set up, and a capability supported by the media resource processor and the data source recorded is negotiated. A media resource controller shall instruct the media resource processor to accomplish negotiation about the following information:

(1) An IP address and a port number of the video channel and a video codec type, which as used here can be a format of H.263, H.264, or MPEG.

(2) An IP address and a port number of the audio channel, an audio codec type, and a package duration, where the type of the audio codec includes a format of G.711, G.723, G.729, narrowband AMR, broadband AMR.

On the media resource processor, a media processing termination T3 needs to be added, which accomplishes processes of converging and associating video and audio data streams as well as conversion of file formats. It shall be noted that the process of setting a channel has been enabled in the H.248 protocol and an SDP (Session Description Protocol) field can be carried in a message command for negotiation about a media capability.

In step 2, the media resource controller sends to the media resource processor an instruction requesting multimedia recording, which initiates the media resource processor to record multimedia information, such as to record video and audio signals. The request includes media control parameters.

The step 2 and a step 3 depicted in FIG. 3 are procedures in which an operation of recording multimedia information is initiated after the video and audio channels have been set up. A command for starting recording is sent from the media resource controller entity to the media resource processor entity. With a multimedia recording package, the media resource processor is instructed to store the record contents of the multimedia data into a specific file. The media recourse processor opens the video and audio channels to receive media streams from a remote end, and stores the media streams into a specified file. Regarding parameters involved in the control procedure, a reference can be made to Signal-record in a multimedia recording package to be discussed below. During media recording, if a file cannot be stored or created according to a record file identifier parameter, then the media resource processor may report a failure of current recording with a reason for the failure.

During recording, in order to acquire whether the result for recording is satisfactory, the media resource processor also provides a replay during recording, and can rerecord if the result for recording is not satisfactory. Specifically, during recording, if a parameter <RestartKey> is received, it indicates that multimedia rerecording shall be performed. When the number of times for rerecording exceeds a maximum number of times for rerecording, the media resource processor may report a failure of recording with a reason for the failure. If a parameter <CancelKey> is received, it indicates that a result for recording shall be cancelled, the current recording has failed, and the recorded file shall be deleted.

In step 3, when recording is finished, the media resource processor feeds back to the media resource controller an operation result as a response.

In steps 4 and 5 depicted in FIG. 3, after finishing recording, the media resource controller instructs the media resource processor to create a persistent file, where a parameter carried includes a location to store the file and a format of the file. A reference can be made to Signal make-persistent in a multimedia recording package to be discussed below.

In the step 4, upon reception of the response in the step 3, the media resource controller sends to the media resource processor a request for creating a persistent storage file, and upon reception of the request, the media resource processor records multimedia data, feeds back a response regarding ongoing multimedia recording in the step 5, and finally transmits a result for recording to the media resource controller in a step 6. Upon receiving the result for recording, the media resource controller feeds back, in step 7, to the media resource processor a response regarding reception of the result for recording. Contents of the result for recording transmitted to the media resource controller in the step 6 includes (1) a location and a name of a recorded file, and (2) a length for which a reference can be made to a definition of Events in a multimedia recoding package to be discussed below.

Contents in a multimedia recoding package of the H.248 protocol as used in the embodiment shown in FIG. 3 can be defined as follows:
   Package Name: Multimedia Record Package;
   PackageID: mr;
   Description: A package indicating recording of a multimedia stream;
   Version: 1;
   Properties: null
   Events:
   1) Recording operation failure;
   Event name: recording operation failure;
   EventID: recfail;
   Description: Recording operation failure;
   EventDescriptor parameters: null;
   ObservedEventDescriptor parameters;
     Parameter Name: Return Code;
     ParameterID: rc;
     Description: descriptive of a failure reason;
     Return Code is defined as follows:
       0x01—Parameter-described file location does not exist;
       0x02—Insufficient storage space;
       0x03—No data stream;
       0x04—Exceed a maximum number of times for rerecording;
       0x05—Others.
     Type: integer;
     Optional: no;
   2) Recording operation Success;
   Event name: recording operation success;
   EventID: recsuc;
   Description: recording operation success;
   EventDescriptor parameters: null;
   ObservedEventDescriptor parameters;
     Parameter 1
     Parameter Name: Result for recording;
     Parameter ID: res;
     Description: The particular way in which the recording process terminated;
     Type: enum;
     Possible value:
       "normal" (0): Result for recording is normal and has been retained;
       "keyend" (1): Result for recording is not retained;
       "trunc" (2): Recoding ends because a timer for a maximum recording length expires;
     Parameter 2
     Parameter Name: Record ID;
     Parameter ID: ri;
     Description: Description of URI of a recorded file;
     Type: string;
     Possible values: Description of a location to store a result for recording and a filename, in a form of such as http://URI, etc;
     Parameter 3
     Parameter Name: Recording duration;
     Parameter ID: rdur;
     Description: The total length of a recorded video in unit of 10 ms;
     Type: integer;
   Signals:
   1) Signal 1;
   Signal name: record;
   SignalID: record;
   Description: Instruct a media resource processor to record;
   SignalType: default is BR (send this action until an end);
     Parameter Name: recording id;
     ParameterID: ri;
     Description: Descriptive of a location to store a recorded file and a filename in a parameter format which can include the following three forms:
       I. File that can be accessed locally, such as filename.3gp;
       II. File that can be accessed through file://, such as file://huawei/filename.3gp;
       III. File that can be accessed through http://, such as http://huawei/filename.3gp;
     Type: String;
     Optional: no;
     Possible values: file id;
     Default: no;
     Parameter name: file format;
     ParameterID: filefmt;
     Description: Descriptive of a format used for a file. This field can be extended according to a practical support;

Type: emum, possible values:
  "AVI" (0): Recorded file is stored in file format of AVI
  "3GP" (1): Recorded file is stored in file format of 3GPP
  "VID" (2): Stored in video file format
Optional: no;
Parameter Name: a maximum number of times for rerecording;
ParameterID: mxatt;
Description: Recording can be deemed failure when the number of times for rerecording exceeds the parameter;
Type: integer;
Optional: Yes, a system default value can be used with an absence of the parameter.
Possible values: larger than 1;
Parameter Name: pretimer;
ParameterID: prt;
Description: Timer for awaiting user start prior to recording;
Type: integer;
Possible value: larger than 1, in unit of 10 ms;
Parameter Name: posttimer;
ParameterID: pst;
Description: If no record signal is received when a post-recording timer expires since the start of recording, the current recording can be considered as being ended, and an end of recording can be reported to a controller;
Type: integer;
Possible value: larger than 1, in unit of 10 ms;
Parameter Name: recordlengthtimer;
ParameterID: rlt;
Description: A maximum length allowed for a multimedia recorded in current recording; this length does not include times of awaiting phase in periods of pre- and post-recording timers; once a length of a recorded multimedia exceeds the parameter, reporting will be implemented.
Type: integer;
Possible value: larger than 1, in unit of 10 ms;
Parameter Name: speed (replay speed);
ParameterID: sp;
Description: Descriptive of a replay speed during recording, a positive value represents acceleration, and a negative value represents deceleration, and a normal speed is 100, where the value takes a value of 0;
Type: integer;
Optional: yes;
Default: 0;
Possible value: larger then −99;
Parameter Name: volume;
ParameterID: vl;
Description: Descriptive of a replay volume, a positive value represents a volume increase, and a negative value is a volume decrease, in unit of decibel;
Type: integer;
Optional: yes;
Default: 0;
Parameter Name: RestartKey;
ParameterID: rsk;
Description: When the key is issued during recording, it indicates that previously recorded contents shall be deleted and be rerecorded.
Type: string;
Optional: yes;
Default: null;
Parameter Name: CancelKey;
ParameterID: clk;
Description: When the key is issued during recording, current recording shall be cancelled;
Type: string;
Optional: yes;
Default: null;

2) Signal 2;
Signal name: persistent storage;
SignalID: makepers;
Description: Instruct a media resource processor to perform media processing for creating a video record file, and indicate that current recording succeeds and requires for storage;
SignalType: default is BR (send this action until an end);
Parameter Name: recording id;
  ParameterID: ri;
  Description: Descriptive of a location to store a recorded file and a filename, in a parameter format which can include the following three forms:
    I. File that can be accessed locally, such as filename.3gp;
    II. File that can be accessed through file://, such as file://huawei/filename.3gp;
    III. File that can be accessed through http://, such as http://huawei/filename.3gp;
  Type: string;
  Optional: no;
  Possible values: file id;
  Default: null;
Parameter Name: file format;
ParameterID: filefmt (0x?);
Description: Descriptive of a format used for a file, which can be a stream media file format of mixed audio and video, or a video file format; a format of this parameter can be extended according to a practical support
Type: emum, possible values:
  "AVI" (0): Recorded file is stored in file format of AVI
  "3GP" (1): Recorded file is stored in file format of 3GPP
  "VID" (2): Stored in video file format
Optional: no;
Statistics: null.

Figure 4:
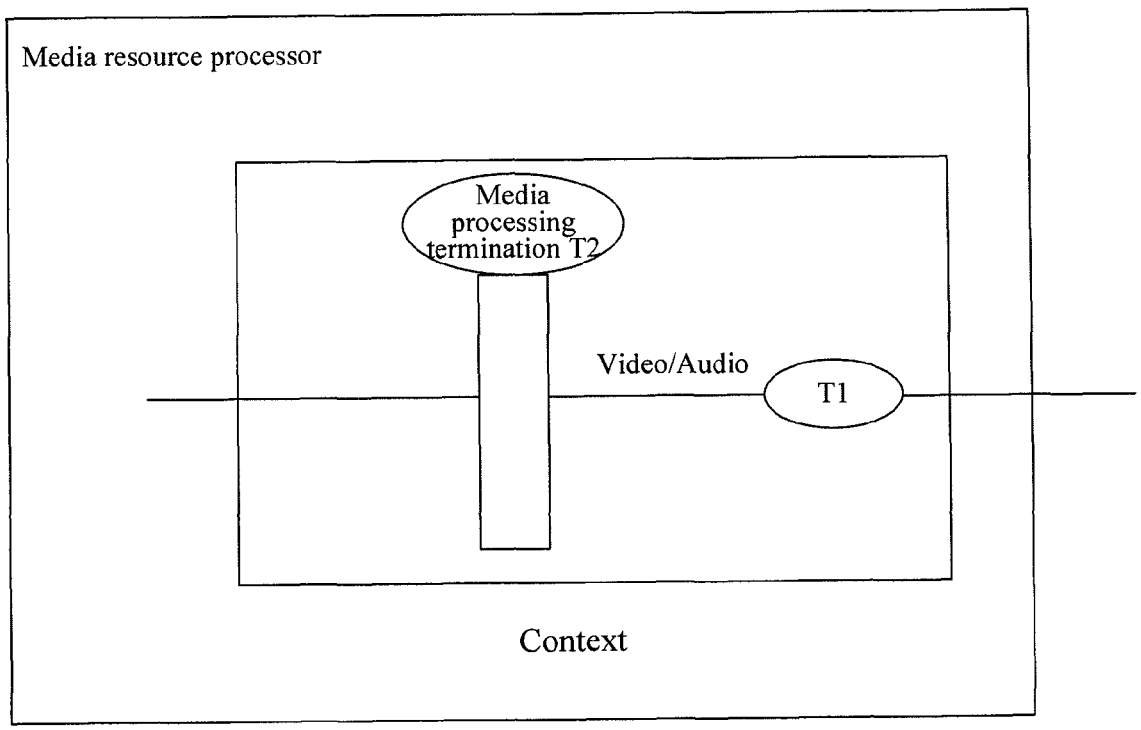
FIG. 4 is a structural diagram of a session model established by a media resource processor according to a second embodiment of the invention.

With reference to FIG. 4, in a second embodiment of the invention, when multimedia recording is performed in the case that audio and video are mixed into a stream for transport, a media processing termination unit needs to be arranged in the media resource processor to accomplish format negotiation and splitting for the mixed stream. During negotiation with a media source about a channel, only one stream channel needs to be set up. Further, for a video codec and an audio codec, the media processing termination can negotiate about a data property in the stream.

Figure 5:
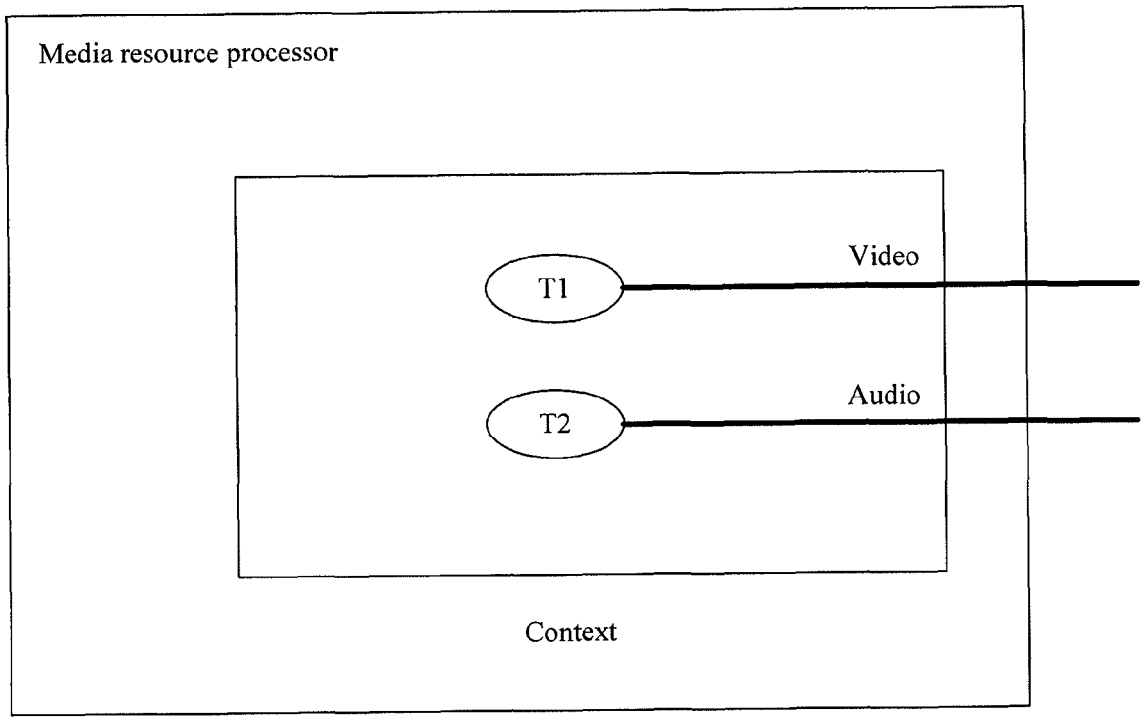
FIG. 5 is a structural diagram of a session model established by a media resource processor according to a third embodiment of the invention.

With reference to FIG. 5, in a third embodiment of the invention, for the case that video and audio are recorded, respectively, video recording process can be implemented through direct operations on a media processing termination receiving the video. For audio recording process, it is supported by H.248 protocol. At this time, the signal can be sent directly to T1, and the file format is specified as a pure video file format.

Figure 6:
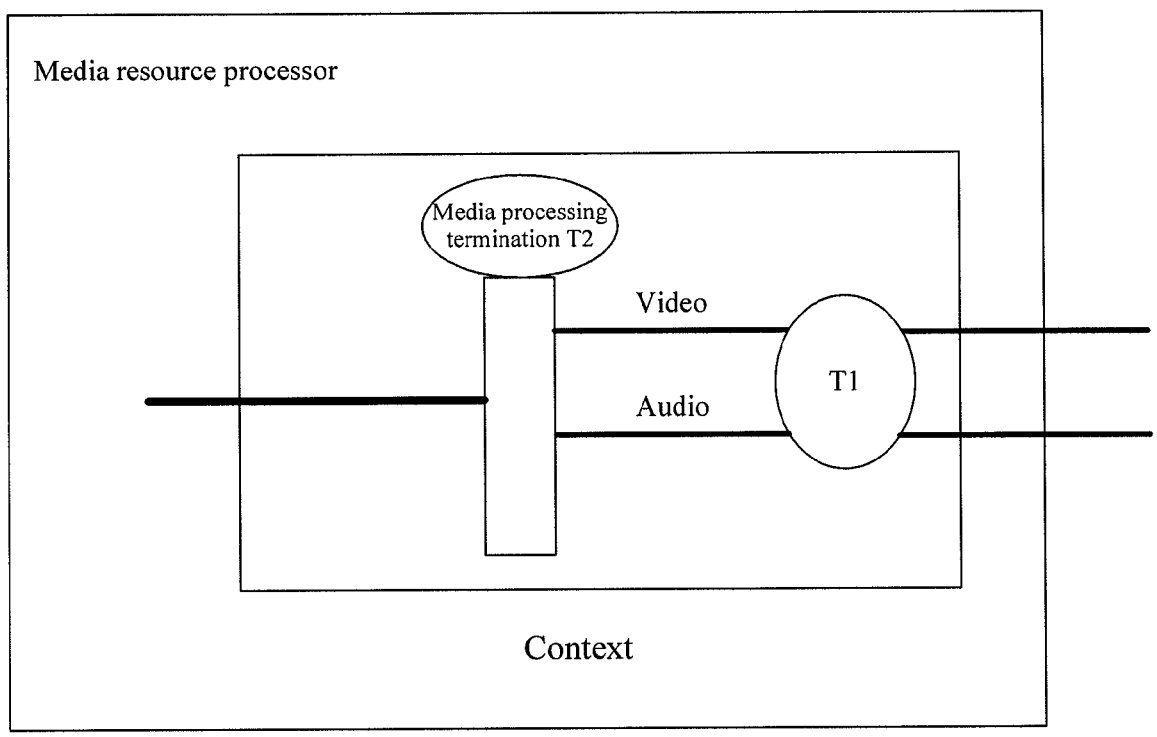
FIG. 6 is a structural diagram of a session model established by a media resource processor according to a fourth embodiment of the invention.

With reference to FIG. 6, in a fourth embodiment of the invention, for the case that two data streams of audio and video are involved at a termination, its control flow is substantially the same as described in the first embodiment, and descriptions thereof will not be repeated.

The invention also provides a system for multimedia recording through the H.248 protocol, including: a media resource controller and a media resource processor, a multimedia channel being set up between the media resource processor and a data source recorded; a recording operation unit adapted to receive an instruction from the media resource controller, and to initiate a multimedia recording operation through the multimedia channel setup with the data source recorded; and a storage operation unit adapted to store multimedia data received by the recording operation unit in a file of multimedia data according to a specified format. Thus, the media resource controller sends a multimedia recording instruction to the media resource processor, and further, upon finishing recording, the media resource processor sends a result for recording to the media resource controller. According to the multimedia recording instruction, the media resource processor initiates the multimedia recording operation through the multimedia channel between the media resource processor and the data source recorded.

The invention provides the following functions:

(1) Multimedia is indicated to be recorded, and quality of the recorded multimedia may be acknowledged through a replay. If the quality of recording is not satisfactory, then a rerecording operation can be performed or the recording can be cancelled.

(2) After finishing recording, the media resource controller instructs the media resource processor to perform processing on a media format, and a file with a specified format is indicated to be created and stored, such as a format of 3GP, AVI, VID, etc.

(3) For an exception during recording, the media resource processor may report in time a reason for the exception to the media resource controller, and process the exception according to the reason.

(4) A result for recording is reported after recording.

In a scenario where media resource devices are controlled through the H.248 protocol, with the method and system of the invention, the media resource controller sends to the media resource processor a multimedia recording package, instructing it to perform multimedia recording in such a way that a capability support can be provided for a service related to multimedia recording, so that a service of such as multimedia message mailbox and the like can be realized, for example, on the media resource control and processing devices of the WCDMA IMS.

What is claimed is:

1. A multimedia recording method, comprising:
   setting up a multimedia channel between a media resource processor and a data source;
   receiving, by the media resource processor, a multimedia recording request instructing the media resource processor to initiate a multimedia recording operation from a media resource controller which communicates with the media resource processor with an H.248 protocol, wherein the multimedia recording request carries media control parameters; and
   according to the media control parameters, storing, by the media resource processor, received media data from the data source; wherein
   the media control parameters comprise a record file identifier parameter for specifying a location and a file name for storing the received media data, and a maximum length of recording parameter which specifies a maximum length allowed for recording,
   wherein the record file identifier parameter and the maximum length of recording parameter are signal parameters specified by the H.248 protocol.

2. The method according to claim 1, wherein the media control parameters further comprises at least one of the following: a maximum number of times for rerecording parameter, a rerecording parameter, and a recording cancel parameter;
   wherein a maximum number of times allowed for rerecording is controlled according to the maximum number of times for rerecording parameter.

3. The method according to claim 1, wherein the media control parameters comprise a file format parameter, the media resource processor stores, according to the file format parameter, the received media data in a file specified by the record file identifier parameter.

4. The method according to claim 1, wherein the multimedia recording request specifies two replay parameters of replay volume and replay speed, indicating that a replay of recorded contents is provided for a user during a recording.

5. The method according to claim 2, wherein, if the rerecording parameter carried in the multimedia recording request is received during recording, then multimedia rerecording is performed.

6. The method according to claim 2, wherein, if the recording cancel parameter carried in the multimedia recording request is received during recording, a result for recording is cancelled and a recorded file is deleted.

7. The method according to claim 1, further comprising: instructing, by the media resource controller, the media resource processor to create a persistent file after a recording ends.

8. The method according to claim 1, further comprising: reporting, by the media resource processor, a result for recording to the media resource controller.

9. The method according to claim 8, wherein the reported result for recording comprises a location, a name, and a length of a recorded file.

10. The method according to claim 1, wherein, when the multimedia recording operation performed by the media resource processor fails, the media resource processor reports a failure reason to the media resource controller.

11. A multimedia recording system, comprising a media resource controller and a media resource processor which sets up a multimedia channel between the media resource processor and a data source, wherein the media resource controller is configured to send a multimedia recording instruction to the media resource processor, and the media resource processor is configured to record media data received from the data source according to the multimedia recording instruction,
   wherein the multimedia recording instruction comprises media control parameters comprising a record file identifier parameter for specifying a location and a file name for storing the received media data, and a maximum length of recording parameter which specifies a maximum length allowed for recording,
   wherein the record file identifier parameter and the maximum length of recording parameter are signal parameters specified by an H.248 protocol.

12. The system according to claim 11, wherein the media resource processor is further configured to send a result for recording to the media resource controller after finishing recording.

13. A media resource processor, comprising:
   a recording operation unit configured to receive an instruction from a media resource controller which communicates with the media resource processor with an H.248 protocol, and to initiate a multimedia recording operation through a multimedia channel which is setup with a data source, wherein the instruction received from the media resource controller comprises media control parameters comprising a record file identifier parameter for specifying a location and a file name for storing media data received from the data source and a maximum length of recording parameter which specifies a maximum length allowed for recording, wherein the record file identifier parameter and the maximum length of recording parameter are signal parameters specified by the H.248 protocol; and a storage operation unit configured to store the media data received by the recording operation unit.

* * * * *